United States Patent [19]

Bagby

[11] 4,017,899
[45] Apr. 12, 1977

[54] SINGLE-TRACK VIDEO FERRITE RECORD/REPRODUCE HEAD AND MANUFACTURING METHOD THEREFOR

[75] Inventor: John F. Bagby, Encinitas, Calif.
[73] Assignee: Spin Physics, Inc., San Diego, Calif.
[22] Filed: Mar. 22, 1976
[21] Appl. No.: 668,873

Related U.S. Application Data

[63] Continuation-in-part of Ser. No. 519,358, Oct. 29, 1974, abandoned.

[52] U.S. Cl. .............................................. 360/122
[51] Int. Cl.² ........................................ G11B 5/221
[58] Field of Search ........................... 360/122, 119

[56] References Cited

UNITED STATES PATENTS 3,775,571  11/1973  Case et al. ......................... 360/122

Primary Examiner—Robert S. Tupper
Attorney, Agent, or Firm—Robert F. Cody

[57] ABSTRACT

Two magnetic ferrite pieces having longitudinal channels formed in the side faces thereof are bonded together with a gapping substance so that the resultant channels form a window. The bonded pieces are precisely slotted to a depth below the apex of the window to form a narrow track-defining comb-like array. The resulting slots are adapted to receive gap-protecting compatible ceramic support material which is so chosen as to wear slightly faster than the ferrite surfaces. In one embodiment, the slots contain ceramic-convertible glass which is devitrified by firing the array. The assembly is then processed to form a ceramic-ferrite-ceramic or ceramic-ferrite transducer sandwich which may be further processed to form part of a magnetic record and/or reproduce head.

3 Claims, 3 Drawing Figures

U.S. Patent
April 12, 1977
4,017,899
FERRITE TRANSDUCER
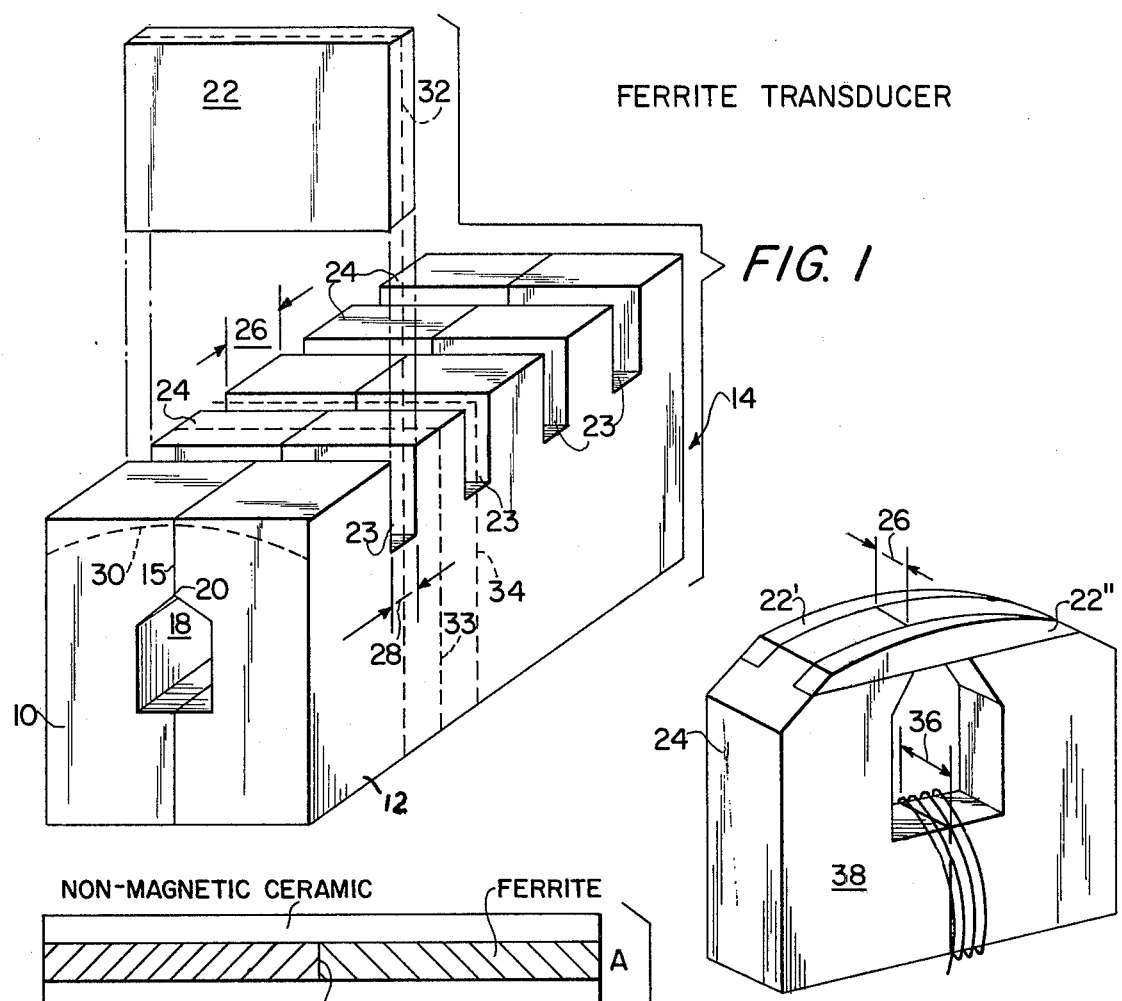
FIG. 1
FIG. 2
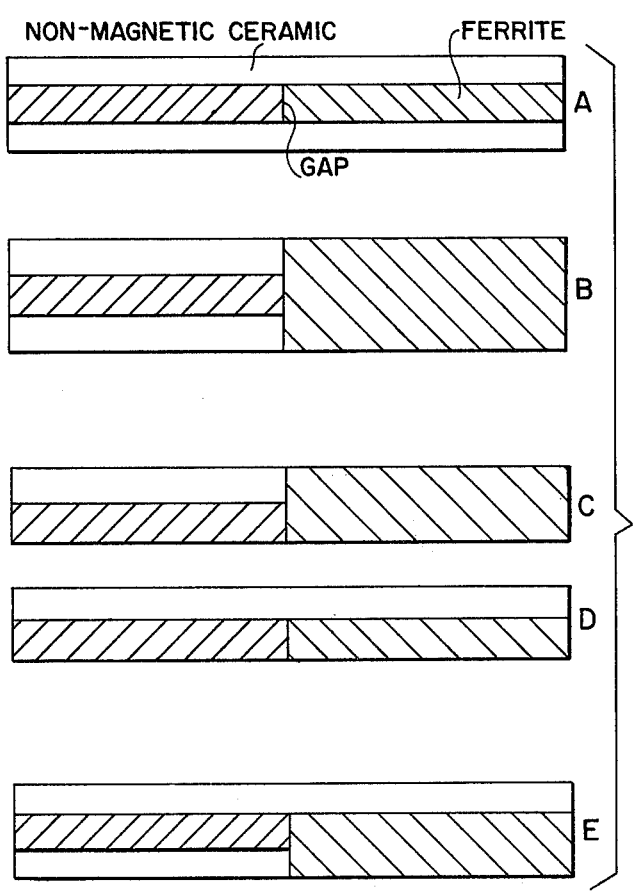
FIG. 3

SINGLE-TRACK VIDEO FERRITE RECORD/REPRODUCE HEAD AND MANUFACTURING METHOD THEREFOR

CROSS-REFERENCE TO RELATED APPLICATIONS

This application is a continuation-in-part of the parent application Ser. No. 519,358, filed in the U.S. Patent and Trademark Office on Oct. 29, 1974 and now abandoned.

BACKGROUND OF THE INVENTION

1. Field of the Invention

The present invention relates in general to magnetic recording and reproduce heads, and more particularly to transducer assemblies having protective surfaces, and to methods of manufacturing such transducer assemblies. The invention has particular relevance to what shall hereinafter be defined as a narrow track head, and to methods of manufacture thereof.

2. Description Relative to the Prior Art

Reference is had to U.S. Pat. Nos. 3,224,073 and 3,761,641 as representative of head manufacture techniques to which the invention is related. As disclosed in each of such patents, in the manufacture of multitrack heads, two sets of slots are sliced into a relatively elongated ceramic block, the first set of slots being fitted with ferrite pieces which are bonded in place. The block and ferrite assembly is then halved longitudinally and, after a gapping substance is deposited on the ends of the exposed ferrite pieces, the two block halves are precisely aligned and bonded back together. Then the second set of slots is fitted with ferrite shield pieces which are bonded to both halves of the ceramic block. The gap between each half of a ferrite piece corresponds to a given information track, the shield pieces being disposed, for example, between pairs of adjacent track-defining ferrite pieces. The whole face assembly is then shaped to optimize the gap cross-sections; and after which the face assembly is fitted with a rear assembly, including magnetic elements, and coils, for completing the magnetic circuits of the track-defining ferrite pieces.

Reference is also had to U.S. Pat. No. 3,710,038 which addresses the long-standing problem of providing a long-lived magnetic video head which withstands a high relative head-to-tape speed and a substantial tape pressure on the head tips. As disclosed in this patent, the appreciable abrasion of the head tips resulting therefrom is is reduced by surrounding the head tips with guard surfaces. By such provision, the tape contact area of the magnetic head is increased and the tape contact force per unit area is correspondingly decreased with consequent extended head tip life. The guard member is formed of a similar ferrite material and adjoins the pole tips. This material provides a tape contact surface having a hardness substantially equal to or a little less than that of the pole tips. If the guard material is incorrectly chosen to have a hardness greater than the ferrite material, the head tips are worn away more than the guard member to draw back its gap surface from the plane of the tape contact surface of the guard member. This results in incomplete contact between the head tips and the magnetic tape and lowers the high frequency component of the output from the magnetic head.

While a head which is manufactured according to the prior art may be functionally acceptable, its structure is such as to leave something to be desired from a manufacturing standpoint: The bonding of the two ceramic block halves requires a painstakingly precise alignment of the gap width of the ferrite pole pieces. Further, in bonding steps subsequent to deposition of the non-magnetic gap, the bonding material may erode into the gap, causing gap length taper, a problem commonly encountered in the glass bonding art. If epoxy is used to bond these surfaces, it becomes difficult in a manufacturing environment to prevent epoxy from collecting on the tape contacting surface of the ferrite pieces. A head manufactured according to this method also has certain performance deficiencies: The geometry of construction constrains the back gap to the same width as the front gap. However, it is desirable to enlarge the back gap area without regard to track width in order to provide a low reluctance path for the magnetic flux and thereby optimize the magnetic circuit.

The current trend toward tape conservation and consequent narrow track widths of 10 mils or even less adds to these manufacturing difficulties by requiring the tape contacting head gap geometry to be extremely narrow. Such narrow ferrite pieces are brittle and subject to edge crumbling both in manufacture and use. Prior art disclosure of guard members or wear shoes may incidentally diminish this problem as to use, but increase the problem as to manufacture, since the brittle ferrite pieces must be additionally subjected to fabrication stresses from attachment of a guard member thereto. The difficulty with using wear shoes or other types of guard members is that they are not directed to the brittleness problem. Wear shoes are primarily adapted to prevent surface abrasion rather than edge crumbling. This means that the emphasis is on increasing the surface area so that the wear shoe shares the abrasive damage of tape contact with the ferrite head tips. As a result, the depth of the head face is more uniformly and slowly eaten away than if only the ferrite tips touched the tape.

The other problem of edge crumbling or, as it is called, "side erosion", is addressed by U.S. Pat. No. 3,584,378. Using a single-track head with a tapered tip, this patent teaches the dipping of such a head into a molten material, such as water glass, and selectively removing thereafter such material from the head to expose the head gap. What remains is a wear-resistant material adhering to the brittle walls of the head. This process, so the patent teaches, is adapted for use with heads which lay down narrow tracks of, for example, 25 mils or even less. However, track widths of 10 mils or less are another matter; such tiny head structures are not amenable, as discrete units, to tapering and dipping without serious danger of damage.

SUMMARY OF THE INVENTION

In what might be considered its most basic form, the invention proposes that the brittle edge walls of narrow gap ferrite pieces be supported by crumble-preventive support surface(s) of a ceramic material having wear and hardness characteristics which are slightly less than the wear and hardness characteristics of the ferrite material used in the head. In the preferred embodiment, the ceramic is selected from that class of glasses which may be devitrified to form what are called "glass ceramics", and which, after devitrification, possess the desired hardness characteristics. Additionally, to avoid the prior art difficulty of aligning and supporting the brittle ferrite head pieces during manufacture, the invention proposes the bonding of two ferrite core pieces with a gapping substance and the precision slotting of this assembly to form a track-defining comb-like array. The slots receive a ceramic-convertible glass material which, during glass-bonding of same to the comb-like array, devitrifies to form support surfaces which are bonded to the ferrite pieces and which possess the previously mentioned wear characteristics. After cooling, the assembly is shaped and polished as in the prior art. The assembly is then diced through the ceramic or, alternatively, through the ceramic and the ferrite. In such manner, a thin-tipped, but wide-backed, transducer is formed with support surfaces on either or both sides of the ferrite without need for any separate bonding steps or undue stress during fabrication.

As noted above, the invention concerns narrow track heads, viz., those which correspond to track widths on the order of 10 mils. While wear may be a problem associated with prior art heads, such is not the problem which is addressed by the invention. Wear is associated with decrease in track depth; in contrast, the invention addresses a track width problem caused by the crumbling of ferrite edge walls in response to the pounding of a head against magnetic tape. This incessant pounding is particularly experienced in rotating head video tape machines, such as the type used for quad head or helical recording. Since the emphasis is not on wear prevention, but rather on edge support, the area of the head face is of little concern. For example, the ceramic support surface can actually be narrower than the track itself.

To form a transducer with support surfaces bonded in varying positions relative to the ferrite, the invention further proposes, in other of its forms, that each ferrite core half be separately slotted previous to their mutual bonding. Glass-convertible ceramic may then be bonded in one or both of the ferrite halves. Following flat lapping and deposition of the gap as in the prior art, the two ferrite halves are bonded together and diced to form, as desired, one or another configuration of transducers with support surfaces.

OBJECT(S) OF THE INVENTION

It is a primary object of the invention to provide record and/or reproduce head structures with narrow gaps which lend themselves to efficient manufacture thereof and possess extended lives when put into their intended uses.

BRIEF DESCRIPTION OF THE DRAWINGS

The invention will be described with reference to the figures, wherein:

FIG. 1 indicates a track-defining comb-like array of ferrite material according to one embodiment of the invention;

FIG. 2 depicts a ferrite transducer with edge wall support surfaces resulting from the assemblage of FIG. 1; and FIGS. 3A to 3E are diagrammatic section views of the face assembly of various embodiments of the invention.

DESCRIPTION OF THE PREFERRED EMBODIMENTS

Referring now to FIG. 1, a narrow track magnetic transducer according to the invention may be formed by bonding a first ferrite core piece 10 onto a second ferrite core piece 12 to form a ferrite assembly 14 with the desired head gap 15. Suitable bonding techniques are known in the art and may include glass-bonding with a high temperature glass to form the desired gap length. Alternately, the gap may be sputtered in place by known deposition techniques and then the two core pieces may be glass bonded. This had the advantage of minimizing apex erosion due to glass not flowing into the gap. Each core piece 10 and 12 is preformed into a bar shape with a longitudinal channel formed in the side face thereof. When the ferrite pieces 10, 12 are joined into the assembly 14, the channels cooperate to form a window 18 having an apex 20. The assembly is then precision slotted in a known manner to a depth just below the apex 20 to form slots 23. Ceramic edge wall support pieces 22, only one of which is illustrated, fit into the corresponding slots 23. Ferrite abutments 24 are left standing between adjoining slots 23, and each has a width 26 precisely equal to the desired track width of a finished transducer. Also, the width 28 of each slot 23 is preferably maintained at more than twice the width of the desired thickness of an edge support ceramic piece 22 to allow for material lost during dicing.

In a preferred embodiment, the ceramic pieces 22 are formed from a ceramic-convertible glass. Ceramic-convertible glass is a well-known commodity and, indeed, has been sufficiently well developed as to warrant at least one textbook (*Glass Ceramics*, P. W. McMillan, Academic Press, Inc. 111 Fifth Avenue, New York, N.Y., Library of Congress Catalog Card No. 64–8067), devoted exclusively to such commodity. Generally, such glass will, in response to some form of nucleating energy, devitrify into ceramic material. The invention places no constraints on the form of the ceramic-convertible glass which is employed other than that it thermally devitrify at a temperature below the melting points of the employed ferrite pieces 10 and 12. Also, it is preferable that the hardness and wear properties of the ferrite be slightly greater than that of the glass-converted ceramic so that the head tips of a transducer made according to the invention will wear slightly less than the edge support material thereof, thereby providing good contouring and head-to-tape contact. One such ceramic-convertible glass, useful in practicing the invention as depicted in FIG. 1, is the chemically machineable ceramic-convertible glass known as Fotoceram. Fotoceram has been well described in the literature, e.g., American Chemical Society, Industrial and Engineering Chemistry, Vol. 45, pg. 115, January 1953; and, indeed, is available from Corning Glass Works, Corning, N.Y.

The assembly 14, which includes the ceramic-convertible glass pieces 22, is — along with additional glass for bonding the pieces 22 in place — fired to a temperature at which the bonding glass — but not the ferrite — melts; the ceramic-convertible glass devitrifying into ceramic while the bonding glass secures the ceramic pieces 22 in place. Then the assembly is cooled, resulting in an assembly of narrow track transducers with side wall support surfaces, for preventing gap edge erosion. The assembly 14 is then contoured by known techniques along line 30 to dimension the depth of the head gap 15, and finally polished and diced.

For a double-side ceramic-supported transducer, the assembly is diced through the ceramic along, for example, planes defined by lines 32 and 34. The resulting transducer is depicted in FIG. 2 which shows a track-defining ferrite piece 24 sandwiched between a first ceramic piece 22' and a second ceramic piece 22''. In typical use, the front gap width 26 is 10 mils or even less. This exceedingly small structure, with a gap width smaller than the width of the printed lines in FIG. 2 of the drawings, may be adequately supported at its side walls by ceramic pieces 22' and 22'' which themselves are yet thinner than the ferrite pole tips. Unlike the prior art wear shoes, which depend on their width to spread the surface friction of the passing tape against the head, the side wall support pieces 22' and 22'' are configured specifically to prevent crumbling of the thin ferrite side walls by the incessant pounding of the pole tips against the tape, particularly in the type of head assembly which intermittently contacts the tape. Such head assemblies are used in a quad head or a helical video tape recorder for laying down transverse or helical tracks, respectively.

For a single-sided ceramic transducer, the assembly is diced through the ceramic and the ferrite along, for example, planes defined by lines 32 and 33. In this case, the dicing operation determines the gap width of the transducer. Typically, as best seen in FIG. 2, the ferrite piece 24 has an integral coil supporting rear portion 38 for completing the magnetic circuit corresponding to the ferrite parts of the transducer assembly. This rear portion 38 has a back gap whose width 36 is greater than its front gap width 26. Manufacture in accordance with the invention thus allows a high efficiency magnetic geometry to be maintained, i.e., the back gap area can be large without regard to track width. Finally, all the elements may be embedded in potting material and fitted with terminal connections and brackets.

Referring now to FIGS. 3A through 3E, various configurations of the face portion of the transducer assembly are shown. FIG. 3A illustrates a diagrammatic section of the face of the double-sided transducer as depicted in FIG. 2. FIG. 3D illustrates a diagrammatic section of a single-sided transducer which has been diced through the ceramic and the ferrite along, for example, the planes defined by lines 32 and 33 of FIG. 1. FIGS. 3B, 3C, and 3E show various configurations possible when the transducer is formed according to embodiments of the invention. To form these further configurations, ferrite core pieces 10 and 12 may be precision slotted either through one or both ferrite halves before bonding the two halves together. Glass-convertible ceramic pieces 22 of appropriate sizes are then bonded in the aforesaid manner to one or both of the halves: the assemblies are flat-lapped and then the gap length is defined, for example, by sputtering. A low temperature glass may then be used to bond the ferrite pieces 10 and 12 together. Contouring, polishing, and dicing follows as set forth above. The result is a transducer having a face configuration such as shown in FIGS. 3B, 3C, or 3E. However, these views are not to be construed as limiting the configurations possible according to this invention.

While a ceramic-convertible glass has been disclosed for the side wall support pieces, it should be clear that any ceramic material of suitable hardness may be substituted therefor.

The invention has been described in detail with particular reference to preferred embodiments thereof, but it will be understood that variations and modifications can be effected within the spirit and scope of the invention.

What is claimed is:

1. A narrow, single-track video magnetic head comprising:
    a. first and second ferrite parts, each having an arcuately contoured front part and a back part;
    b. non-magnetic means bonding said ferrite front and back parts together, thereby to form transducer front and back gaps between said ferrite front and back parts, said ferrite front parts at said front gap being 10 mils or less in width and substantially less in width than said ferrite back parts at said back gap, the side walls of said front part having ferrite wall portions that extend across said front gap substantially parallel to each other on both sides of said front gap; and
    c. separate ceramic pieces, mounted in parallel and glass-bonded to both said ferrite wall portions at both sides of said front gap, for protecting said gap from deteriorating, said ceramic having slightly less wear resistance than said ferrite such that said ceramic wears slightly faster than said ferrite first and second parts.

2. The structure of claim 1 wherein the width-wise dimensions of said ceramic parts are both less than 10 mils.

3. A narrow, single-track video magnetic head for use with a rotating head video tape recorder, comprising:
    a. first and second ferrite parts, each having an arcuately contoured track-defining front part of 10 mils or less in width and a back part;
    b. non-magnetic means bonding said track-defining front parts together, thereby to form a transducer gap between said ferrite front parts, said ferrite front parts at said gap being substantially thinner than said ferrite back parts, said track-defining front parts having side walls that extend across said gap substantially parallel to each other on both sides of said gap; and
    c. side wall supporting ceramic pieces, glass-bonded in parallel to both side track-defining front parts at said side walls of said gap thereby to form a ceramic-ferrite-ceramic sandwich substantially equal in width to said back parts, for protecting said gap from deterioration due to the crumbling of said side walls as a magnetic tape pounds thereagainst, said ceramic having slightly less wear resistance than said ferrite such that said ceramic wears slightly faster than said ferrite first and second parts.

* * * * *